United States Patent [19]

Kromrey

[11] Patent Number: 4,652,476
[45] Date of Patent: Mar. 24, 1987

[54] REINFORCED ABLATIVE THERMAL BARRIERS

[75] Inventor: Robert V. Kromrey, Campbell, Calif.

[73] Assignee: United Technologies Corporation, Hartford, Conn.

[21] Appl. No.: 698,723

[22] Filed: Feb. 5, 1985

[51] Int. Cl.[4] .......................... B32B 1/08; B32B 3/26
[52] U.S. Cl. ........................................ 428/36; 60/752;
 138/173; 138/174; 428/167; 428/182; 428/222;
 428/920
[58] Field of Search ................. 428/36, 222, 167, 182,
 428/920; 60/255, 752; 138/147–149, 173, 174

[56] References Cited

U.S. PATENT DOCUMENTS

| | | | |
|---|---|---|---|
| 2,977,885 | 4/1961 | Perry, Jr. et al. | 102/98 |
| 3,001,362 | 9/1961 | Runton | 60/35.6 |
| 3,090,196 | 5/1963 | Brewer | 60/35.6 |
| 3,122,883 | 3/1964 | Terner | 428/36 |
| 3,289,703 | 12/1966 | Brown | 138/149 |
| 3,311,013 | 3/1967 | Phipps | 86/20 |
| 3,426,528 | 2/1969 | Mangum et al. | 60/255 |
| 3,849,983 | 11/1974 | Cherry | 60/255 |
| 3,952,506 | 4/1976 | Macbeth | 60/255 |
| 4,118,928 | 10/1978 | Lyles | 60/255 |

Primary Examiner—Paul J. Thibodeau
Attorney, Agent, or Firm—C. G. Nessler; Charles E. Sohl

[57] ABSTRACT

Ablative material is adhered to the surface of an article, such as the combustor of a ramjet, by a folded extensible member attached to the surface. Thus, when an ablative material such as a filled silicone rubber expands during use, the retaining member will extend with it to a void shearing separation, but at the same time will retain it against the surface. In a combustor a rib will run helically along the length of the interior of the combustor. When gases are swirling within the combustor, the pattern of the helix will be opposite to the pattern of the swirl.

10 Claims, 14 Drawing Figures

REINFORCED ABLATIVE THERMAL BARRIERS

TECHNICAL FIELD

The present invention relates to the thermal barriers of the ablative type, particularly those applied to ramjet combustor construction.

BACKGROUND

In rockets, ramjets and other vehicles which fly through air and space, it is a continuing problem to protect them from the effects of heat, both that generated by the passage through air and that due to the thermal energy which is expended in propelling the vehicle. Ablative materials have been developed as an efficient means for cooling nose cones and combustors. Such materials by a combination of fusion and evaporation absorb and convey away heat from a surface.

The present invention is particularly concerned with the use of ablative materials as a thermal barrier on the inside of the case of a rocket or ramjet engine. Generally, such engine cases are cylindrical structures and the ablative material lines the interior. See for instance, U.S. Pat. Nos. 3,001,362 to Runton and 3,122,883 to Terner. U.S. Pat. No. 4,118,928 to Lyles shows a two piece liner with an undulating clearance interface, to absorb stresses.

In many rocket applications the duration of firing is relatively short and a variety of different ablation materials and attachment schemes may be used. However, in ramjet applications as well as in some rocket applications, the duration of firing is long. During this period the thermal barriers are exposed to an oxidizing hot gas environment and substantial pressure and it is more difficult to provide an effective barrier. In the past, two basic types of combustor liners have been found effective: one is a tape-wrapped thermosetting polymer material, such as silica fiber impregnated with phenolic resin. But this has been prone to oxidation failure of the resin resulting in the hot combustion gases penetrating the liner and contacting the metal case. In addition, such materials also tend to have high thermal conductivities when they become charred; and this is disadvantageous insofar as insulating the metal case. The other type of liner is elastomer, such as the silicone base elastomer Dow Corning DC 93-104 (Dow Corning, Midland, Mich.). These materials are more desirable because they are oxidation resistant and have lower thermal conductivity when charred. However, because they are flexible during use they are subject to blistering if gases penetrate into the region between the elastomer liner and the metal case. When a liner blisters or becomes unbonded from the combustor case, it becomes subject to being blown off from the surface it is intended to protect which will result in failure of the engine.

While the elastomeric insulations are nonetheless preferred, they have other distinct phenomena which cause design difficulties insofar as keeping them functionally attached to a metal case. First, they tend to swell as they become heated and this dimension change can cause failure of the bond with the combustor wall. The very same swelling stresses also tend to cause the elastomer to blister or raise up from the case surface and to thus project into the path of the combustion gases. It is believed also that gases may be generated near the case by elastomer degradation and contribute to the aforementioned blistering. Second, charring of the elastomer surface nearest the hot combustion gases occurs as a natural and intended degradation of the ablative material. But, associated with the formation of the char is shrinkage which causes fissures in the insulating surface layer. If the fissures should propagate completely through the elastomer barrier they will allow the hot combustion gases to come in contact with, and fail, the case.

Based on the foregoing observations, various techniques have been explored to find ways to maintain the elastomer in contact with the case and avoid great cracking. One approach has been to apply metal honeycomb cell material to the inner surface of the case prior to applying the ablative material. The cells run radially inward and are filled with elastomer. Thus, the ablative material divided up into separate elements and cracks are prevented from propagating along the interior surface of the material. The welding of the honeycomb material to the case retains the individual pieces of ablative material on the surface. However, the honeycomb is costly and completely filling the individual cells presents technical problems. In addition, the cumulative cross sectional area of metal running radially disadvantageously increases the amount of heat that is transferred to the case.

As a result, there has been a continuing need for improved ways of retaining ablative materials on surfaces of combustors and other aerospace devices.

DISCLOSURE OF INVENTION

An object of the invention is to improve the performance of ablative materials which swell and tend to blister off surfaces they are intended to protect. A further object of the invention is to improve the way in which combustors are lined with molded-in-place ablative materials. A further object of the invention is to prevent material which lines the interior of a combustor from becoming detached from the wall of a combustor during use.

According to the invention, a heat resisting article has on its surface an ablative thermal barrier material. Within the thermal barrier material is embedded a folded extensible member. When the article is a combustor, the folded extensible member is a rib which runs circumferentially or helically about the interior of the combustor. Thus, when the ablative material swells and exhibits the tendency to lift or blister from the surface, the relatively rigid ribs tend to hold the material to the surface by virtue of their corrugations. But, at the same time, the rib or ribs will tend to extend themselves radially inward as the material continues to swell. This compliance avoids a tendency for the ablative material to simply separate from the rib as would be the case were the rib to have no corrugations and to be unextensible.

The rib of a combustor preferably runs in a helical pattern down the interior of the combustor. When the rib is put in place prior to the introduction of the ablative elastomer, the introduction of the elastomer is made more easy, and a continuous fibrous reinforcement may be introduced within the ablative material, by virtue of the fact that the rib defines an elastomer piece which is continuous along the length of the combustor. In a combustor which has gases flowing through it along a helical pattern, the pitch of the helix of a rib is chosen so that it is opposite to that of the gas pattern. Thus, the rib will tend to be generally transverse to the direction of the gas flow and this will reduce the deleterious effects of the gas on the combustor walls.

The rib is preferably a thermosetting polymer impregnated fabric. The resin also is utilized to bond the rubber and the fabric to the article being protected. The rib is intermediate in rigidity between the metal case and silicone rubber. While the rib is ablative in character and extensible, it has adequate elastic modulus and strength to hold the rubber in place.

The foregoing and other objects, features and advantages of the present invention will become more apparent from the following description of preferred embodiments and accompanying drawings.

BEST MODE FOR CARRYING OUT THE INVENTION

The invention is described in terms of a combustor for a rocket or ramjet engine lined with ablative material. It will be evident that the invention will be applicable to other types of protective surface layers which swell while performing their function, and not only for combustor protection but for any other object which is to be protected from heat, such as nose cones, and so forth.

Figure 1:
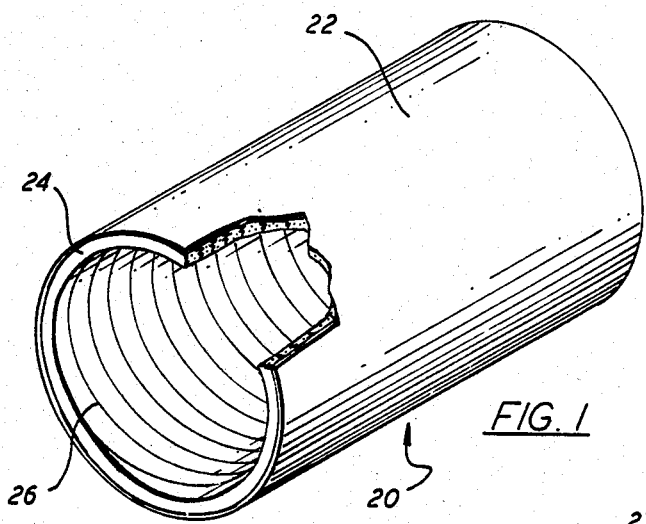
FIG. 1 shows a cylindrical article such as a combustor segment having on its interior an ablative material with a helical rib.
Figure 2:
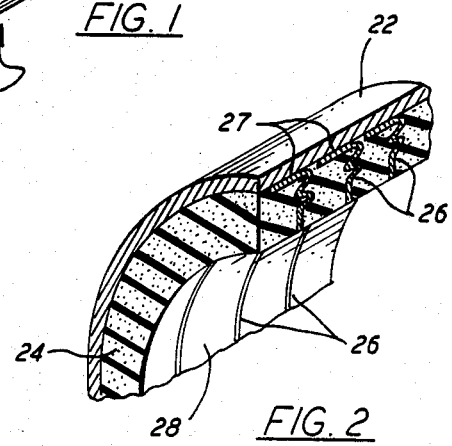
FIG. 2 is a portion of the cross section of the combustor of FIG. 1. The Figure shows in more detail the nature of a folded and extensible rib.

In FIG. 1 a typical combustor liner segment 20 is shown. The metal case 22 is cylindrical in shape and within its interior is a layer 24 of ablative type of material. Preferably the case is made out of a steel or nickel alloy such as commercial alloys D6A steel, 17-4 Ph stainless steel, Inconel 600 nickel alloy, etc.; and, the ablative material is a ceramic particulate filled silicone rubber, such as Dow Corning DC 93-104 (Dow Corning, Midland, Mich.). Running around the interior of the case 22 and embedded in the ablative material layer 24 is the helical rib 26 which is shown in FIG. 2 in more detail. The helical rib is folded, or corrugated, with the corrugations running along the length of the helix. The cross section of the rib 26 is seen to approximate a W and to extend from the case 22 (to which the rib leg 27 is welded) to the interior surface 28 of the ablative material. As will be appreciated from the discussion herein, the rib need not extend entirely to the surface.

Figure 3:
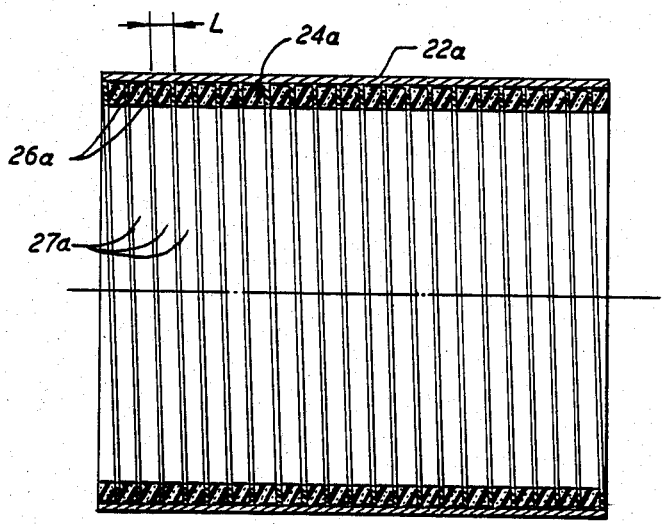
FIG. 3 is a partial section of a combustor having a helical rib on its interior and ablative material in the spaces between the turns of the rib. Fiber reinforcement runs continuously along the pitch of the helix of the rubber material.

One basic aspect of the invention is that the rib runs helically along the length of the combustor case 22a, and as shown in the partial cross section of FIG. 3 such a rib 26a may be uncorrugated. The helix has a pitch L which is chosen by the designer e.g., it might approximate the cell dimension of a honeycomb. By example, the ablative material may have a thickness of about 13 mm and the rib pitch will be about 10 mm. Preferably, the rib has a thickness of about 0.4 mm and is made of a silica glass fabric impregnated with a high temperature thermosetting epoxy, polyimide, phenolic or other resin. I prefer to use BMI (bis-maleimide) resin. The rib is adhered to the surface with a parent or otherwise compatible resin of that used to form the rib. During use, the helical rib serves the function of preventing the propagation of cracks along the length of the combustor. Yet, it is considerably easier to fill the spiral groove of the helix with elastomer 27a compared to the older honeycomb configuration.

In the second basic aspect of the invention, the rib is corrugated. Preferably, the corrugation is combined with the helical aspect but as will be appreciated from the following discussion in other applications multiple circular ribs may be used or even discontinuous small segments of corrugated rib may be used.

Figure 4:
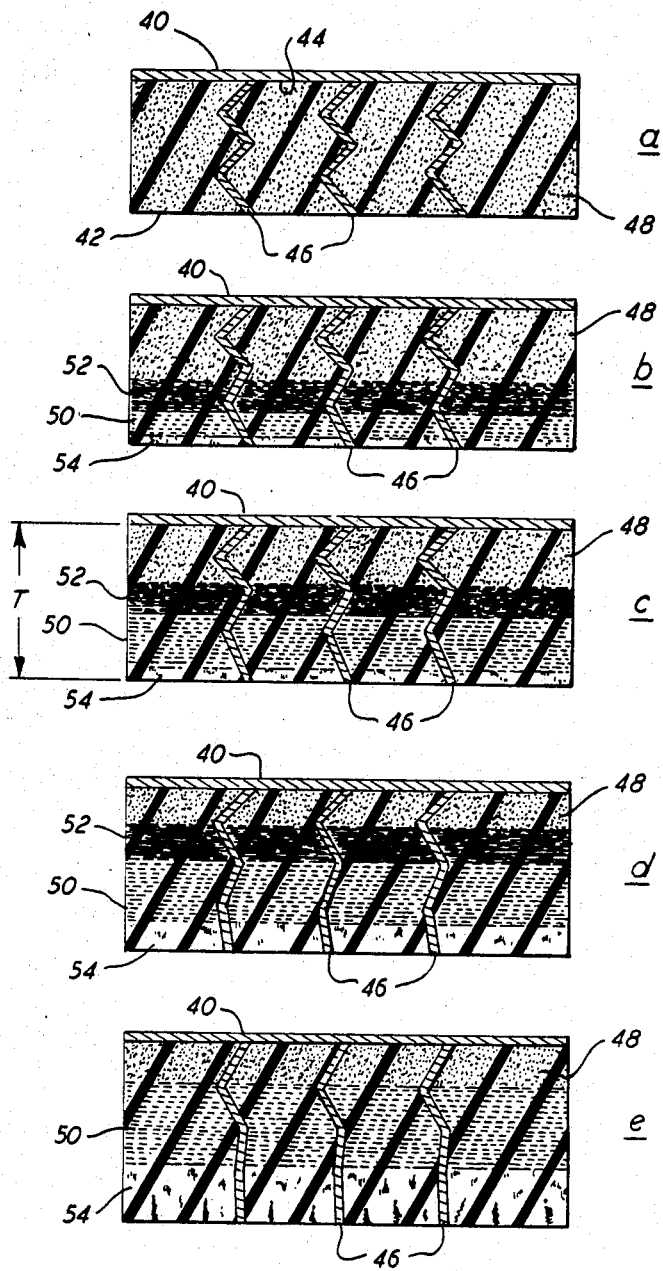
FIG. 4 shows sequentially how an ablative material degrades, swells, and causes a folded rib to extend with time running from a to e.

Referring again to the preferred embodiment of the invention wherein the combustor case has a corrugated helical rib, the sequential series of schematic cross sections a-e shown in FIG. 4 indicate the change in appearance of a combustor cross section with time. The ablating elastomer material 48 is bonded at location 44 to the interior surface of the combustor case 40 and the corrugated ribs 46 extend radially inward to the liner inner surface 42. The surface 42 is exposed to an extreme heat flux which causes ablation. The ablative material undergoes physical and chemical changes: the material thermally expands and starts to decompose; then it is pyrolyzed into a porous soft char layer; next, the char layer hardens; and finally the char layer shrinks and the first-charred surface cracks owing to dimensional contraction compared to the underlying layers. It is seen in the sequential parts of the Figure how the hard char layer 54 progressively expands toward the case 40. Immediately beneath it is an also increasing dimension porous soft char layer 50. Immediately beneath this is the thermally expanded and decomposing base material 52. Unaffected material 48 remains nearest the case. The thermally decomposed material 52 has greater dimension than the original ablative material. Since the cylindrical combustor liner has inherent constraint in the circumferential direction and since there is generally longitudinal axis restraint as well, when the ablative material expands it tends to swell in dimension radially inward. As indicated in the Figure, this causes an increase in radial thickness T and results in radial extension of the embedded ribs 46 in the sequence. Finally, as represented by the FIG. 5e, cracks appear in the innermost and hottest surface of the hard char layer 54. However, it is seen that while the corrugated ribs have become virtually entirely extended, they still capture and hold the ablative material onto the surface. Generally, as shown also at FIG. 5e, the design thickness of an ablative layer will be such that at the time it has completed serving its intended function there is hardly any ablative material 48 in its original condition. But the ribbed ablative thermal barrier will thus have kept the case within its operating limit during its term of operation.

From the foregoing, it can be seen what the function of the corrugated ribs is: When the ablative material is a thermally expanding material, the extent of corrugation is diminished as the material expands. This enables the ribs to still perform their intended retention function. Of course, it will be appreciated that the corrugated or folded rib design which extends during use is most appropriate for use with the elastomer type of ablative material. Because of the rigidity of thermosetting ablative materials like phenolics and their lack of propensity to expand, a like extension will not be observed when a folded rib is used. In fact, with phenolic materials, the ribs may instead simply be straight radial structures, as shown in FIG. 3, although folded ribs are preferred because of the mechanical locking achieved. And, the invention will be usable with still other types of ablative materials. For example, if the ablative is a relatively weak, porous or ceramic-like material, ribs will be advantageous to provide strength to the structure. Such materials often must be cast or molded in place, and circumferential ribs provide greater ease of placement and assurance of completeness in a combustor than the small cells which characterize honeycomb allow.

Figure 5:
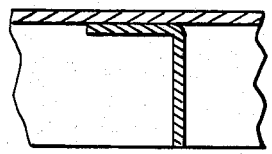
FIG. 5 shows a straight rib.
Figure 6:
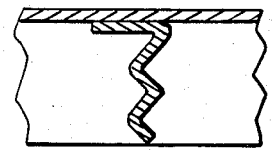
FIGS. 6-9 show various configurations of extensible folded ribs.
Figure 7:
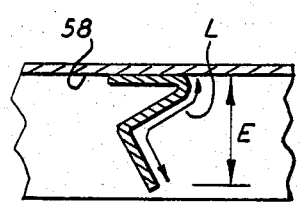
Figure 8:
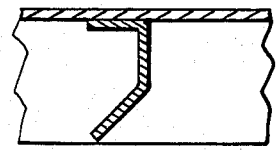
Figure 9:
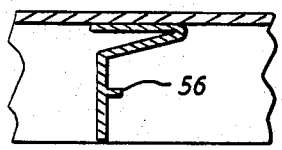

The term "corrugation" or "folded" is used in a general way herein as the different configurations of ribs which may be used are illustrated by the FIGS. 5-9. FIG. 5 shows a straight unfolded and uncorrugated rib. FIG. 6 shows a W-corrugated rib described above. FIGS. 7 and 8 show simpler corrugations. FIG. 9 shows the folded part of the rib nearer the case, compared to the other designs; and there is a prong 56 which aids in holding the most heat-affected material onto the surface. Thus, it may be seen that generally in the invention a rib is only required to be a member that is in some way folded so that its distance of extension E from the case surface 58 is less than its total length L, as shown in FIG. 7, and that it have the ability to be extended when pulled at its end from the surface.

Figure 10:
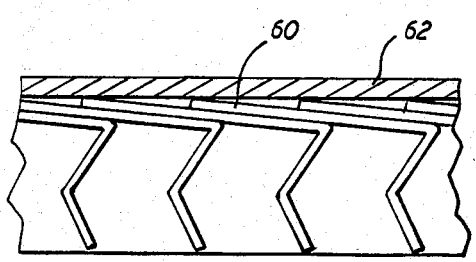
FIG. 10 shows how the ribs preferably overlap nearest a combustor wall.

As shown in FIG. 10 it is preferable that the ribs have an elongated L-shape, so that one rib e.g., rib 60 overlaps 1-4 adjacent rib turns. This construction provides a continuous layer of rib material adhered to the inside of the case 62 and the rib polymer resin will thus attach the elastomer between the ribs to the case by this means. Adhesive may be applied directly to the case wall to help hold the rubber, in the absence of an L-shape rib which functions as just described.

It is not necessary that the rib extend entirely through the ablative material as shown in the Figure. A substantial penetration may be sufficient in particular instances. While the discussion herein has concentrated on ribs running the length of a combustor, the principles of the invention of a folded extensible member will encompass discontinuous segments and even regular shape cross section pieces applied to the surface of any article.

In certain combustors the gases flow through in a helical path since such a pattern tends to permit shorter overall combustor lengths. The swirl is induced by the manner in which the gases are introduced, e.g., by the orientation of nozzles, orifices, vanes, etc. However, the advantage which swirling permits also tends to be more arduous on the walls of the combustor. The helical rib of the present invention aids in resisting such degradation by virtue of the advantages already described, but it is even better when the pattern of the rib helix is opposite the pattern of the gas helix or swirl. This disposes the ribs transverse to the direction of the gas flow (indicated by arrows 27 in FIG. 3) and as such minimizes the scouring action of the gases.

The rib may be made of any material which tends to not thermally expand and which is sufficiently strong. It may be metal but a thermosetting polymer is preferred. While the silicone rubber is referred herein as the "ablative material" this does not mean the rib cannot also ablate. As is well known the rib material described above will also ablate. The essential feature of the invention is that the rib is dimensionally stable compared to the rubber and relatively small in area exposed to the hot gases. Rubber or other compressible material makes particularly convenient the in situ fabrication of ribs.

In the manufacture of combustors with helical internal ribs, the preferred way of making the invention is to mold and cure a strip of silicone rubber material so it is placed as a helix in the interior of the case. The adjoining edges of the rubber are molded so that when they adjoin each other their shapes define the corrugated and helical shape of a rib. Uncured rib material is interposed between the adjacent rubber turns and pressing and heating in situ causes both curing and adhesion of the rib to the inside of a combustor case.

Although this invention has been shown and described with respect to a preferred embodiment, it will be understood by those skilled in the art that various changes in form and detail thereof may be made without departing from the spirit and scope of the claimed invention.

I claim:

1. An article having on its surface an ablative thermal barrier material within which is embedded a folded member said member being extensible in a direction substantially perpendicular to the article surface.

2. The article of claim 1 characterized by ablative material which expands upon heating and increases in dimension relative to the surface and by a folded member which becomes less folded and more extended from the surface as the ablative material expands.

3. The article of claim 1 characterized by a folded member which is a corrugated rib.

4. The article of claim 1 wherein the article is a hollow cylinder for containing hot gases, the article having ablative material on the inside of a cylindrical shell, characterized by a plurality of extensible, folded circumferential members spaced apart along the length of the cylinder interior.

5. The article of claim 1 wherein the article is a hollow cylinder for containing hot gases, the article having ablative material on the inside of a cylindrical shell characterized by a helical member running along the length of the cylinder interior.

6. The article of claim 5 characterized by ablative material which expands and increases radially in thickness when heated, the expansion causing radial extension of the rib and decrease in the degree to which the rib is folded.

7. The article of claim 5 characterized by an L-shaped rib where the adjacent rib parts overlap and form a continuous layer inside the cylindrical shell under the ablative material.

8. The article of claim 5 wherein the article is a combustor.

9. A hollow cylindrical article for containing hot gases having a cylindrical shell lined with an ablative material characterized by a folded extensible rib extending radially inwardly within the material and running helically along the interior of the shell, said rib being attached to the interior of the shell.

10. The article of claim 9 wherein the article is configured so that hot gases swirl through it in a helical pattern opposite to the pattern along which the rib runs, so the rib helix thereby tends to be placed transverse to the direction of gas flow.

* * * * *